US009868534B2

(12) United States Patent
Hara et al.

(10) Patent No.: US 9,868,534 B2
(45) Date of Patent: Jan. 16, 2018

(54) HEAT REMOVAL STRUCTURE OF AIRCRAFT MAIN LANDING GEAR BAY

(71) Applicant: MITSUBISHI AIRCRAFT CORPORATION, Aichi (JP)

(72) Inventors: Nobuhide Hara, Tokyo (JP); Tadahiko Suzuta, Tokyo (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 105 days.

(21) Appl. No.: 14/973,098

(22) Filed: Dec. 17, 2015

(65) Prior Publication Data

US 2016/0214720 A1 Jul. 28, 2016

(30) Foreign Application Priority Data

Jan. 26, 2015 (JP) .................................. 2015-12564

(51) Int. Cl.
B64D 13/00 (2006.01)
B60T 5/00 (2006.01)
(Continued)

(52) U.S. Cl.
CPC .............. B64D 13/006 (2013.01); B60T 5/00 (2013.01); B64C 1/14 (2013.01); B64C 7/00 (2013.01); B64C 25/001 (2013.01); B64C 25/16 (2013.01); B64C 25/36 (2013.01); F16D 65/847 (2013.01); B64C 25/12 (2013.01); B64C 25/34 (2013.01)

(58) Field of Classification Search
CPC ............ B64D 13/006; B64C 1/14; B64C 7/00
See application file for complete search history.

(56) References Cited

U.S. PATENT DOCUMENTS

2013/0092787 A1* 4/2013 Polubinski .............. B64C 25/42 244/50
2014/0239121 A1* 8/2014 Kirkbride ............... B64C 25/42 244/103 R
2015/0001342 A1* 1/2015 Takenaka ................ B64C 25/12 244/119

FOREIGN PATENT DOCUMENTS

CH 281640 7/1952
JP 2014-169070 A 9/2014

OTHER PUBLICATIONS

J Pc Van Heijst: "Photos: Boeing 737-8K2 Aircraft Pictures | Airliners.net", www.airliners.net, May 8, 2008 (May 8, 2008), XP055277559, URL:http ://www. ai rl iners.net/photo/T ransavia-Ai rlines/ Boeing-737-8K2/1353388/U [retrieved on Jun. 3, 2016].*
(Continued)

Primary Examiner — Justin M Benedik
(74) Attorney, Agent, or Firm — Pearne & Gordon LLP

(57) ABSTRACT

An aircraft includes: a fairing which covers a lower part of a fuselage having a main landing gear bay (MLG bay), and defines a ventilation cavity communicating with the MLG bay between the fairing and the fuselage; and a heat removal system which removes heat generated from the MLG inside the MLG bay to the outside of the MLG bay by suctioning/discharging air through an inlet port and an outlet port leading from the ventilation cavity or the MLG bay to external air. The fairing defines a wheel opening through which a wheel of the MLG enters and exits, and defines a ventilation port, which functions as one of the inlet and outlet ports, between the fairing and an outer peripheral part of the wheel exposed from the wheel opening to the lower side of the MLG bay when the MLG is retracted.

9 Claims, 6 Drawing Sheets

(51) Int. Cl.
   *B64C 1/14* (2006.01)
   *B64C 7/00* (2006.01)
   *B64C 25/00* (2006.01)
   *B64C 25/16* (2006.01)
   *F16D 65/847* (2006.01)
   *B64C 25/36* (2006.01)
   B64C 25/12 (2006.01)
   B64C 25/34 (2006.01)

(56) References Cited

OTHER PUBLICATIONS

Extended European Search Report issued in application No. EP 15 19 9533 dated Jun. 17, 2016.
J PC Van Heijst: "Photos: Boeing 737-8K2 Aircraft Pictures, Airliner.net", www.airliners.net, May 8, 2008, XP055277559.

* cited by examiner

HEAT REMOVAL STRUCTURE OF AIRCRAFT MAIN LANDING GEAR BAY

BACKGROUND OF THE INVENTION

Field of the Invention

The present invention relates to a structure for protecting members which are present around a main landing gear of an aircraft when the main landing gear is retracted from heat propagating from the wheel, the brake, etc. of the main landing gear.

Description of the Related Art

The wheel, the brake, etc. of the main landing gear of an aircraft generate heat while in use. Particularly, the brake generates a large amount of frictional heat when braking the wheel of the airframe which is running at a high speed after landing.

Japanese Patent Laid-Open No. 2014-169070 proposes to install a device which forcibly cools a brake on a door covering the wheels of a retracted main landing gear.

The brake cooling device of the above disclosure includes an air handling assembly which suctions external air through an opening which penetrates the door covering the wheels, and an air delivery assembly which guides the external air to one surface side of a brake stack. This device causes a flow of air across the brake stack on the basis of a differential pressure occurring between the one surface side and the other surface side of the brake stack. Air having absorbed heat from the brake stack enters a cavity inside the air handling assembly, and is discharged into external air through an outlet port formed at the rear end of the air handling assembly.

Around the main landing gear retracted inside a main landing gear bay (main landing gear compartment) housing the main landing gear, there are members requiring protection from heat propagating from the main landing gear. One example is a structural member which separates the main landing gear bay and a pressurized section from each other. To prevent the structural member from exceeding its allowable temperature due to heat propagating from the main landing gear, one can conceive of increasing the distance between a heat generating part of the main landing gear and the structural member, or providing the structural member with a heat insulation material.

However, an extra space of the main landing gear bay required for the increased distance or the thickness of the heat insulation material adds to the size of the airframe. The weight and air resistance of the airframe increase accordingly.

The same is true for the brake cooling device of Japanese Patent Laid-Open No. 2014-169070: the space required for installing the device in the main landing gear bay adds to the size of the airframe. In addition, the brake cooling device including the plurality of assemblies is heavy in weight on its own.

Therefore, under constraints on the space of the main landing gear bay into which the main landing gear is retracted and on the weight of the airframe, the present invention aims to provide a structure which can protect the members around the main landing gear from the heat generating part of the main landing gear.

SUMMARY OF THE INVENTION

A heat removal structure of an aircraft main landing gear bay of the present invention includes: a fairing which covers a lower part of a fuselage having a main landing gear bay formed therein into which a main landing gear having a wheel is retracted, and defines a ventilation cavity communicating with the main landing gear bay between the fairing and the main landing gear bay; and a heat removal system which removes heat generated from the main landing gear retracted inside the main landing gear bay to the outside of the main landing gear bay by suctioning/discharging air through an inlet port and an outlet port leading to external air, wherein the fairing defines a wheel opening through which the wheel of the main landing gear enters and exits, and defines a lower ventilation port, which functions as one of the inlet port and the outlet port, between the fairing and an outer peripheral part of the wheel which is exposed from the wheel opening to the lower side of the main landing gear bay when the main landing gear is retracted.

In the present invention, the front side means the nose side of the aircraft, and the rear side means the empennage side of the aircraft.

In the present invention, the upper side and the lower side are in accordance with the upper side and the lower side in the vertical direction when the aircraft is in a horizontal attitude.

The heat removal structure of the present invention causes a flow of air inside the main landing gear bay by suctioning/discharging air through the inlet port and the outlet port of the heat removal system. As air flows, heat generated from the main landing gear is removed to the outside of the main landing gear bay, so that heat propagation to members located around the main landing gear can be suppressed.

Thus, even if the main landing gear is retracted after takeoff while the temperature of the heat generating part of the main landing gear is still high, it is possible to keep the temperatures of the members which are located around the main landing gear and require protection from high temperatures under their allowable temperatures, and to maintain the strength and performance required of these members.

The heat removal structure of the present invention utilizes the clearance located in the outer periphery of the wheel of the main landing gear, and can be realized by simply forming an opening in the fairing. Therefore, it is possible to improve the fuel efficiency by downsizing the airframe and keeping down the weight of the aircraft compared with the case where the distance from the heat generating part of the main landing gear to the members is increased or a heat insulation material is used.

Moreover, according to the present invention, even if the tire of the wheel bursts up in the air, the pressure of gas blowing out of the tire can be released into external air through the inlet port and the outlet port, so that it is possible to avoid generation of an excessively high internal pressure in the main landing gear bay or the ventilation cavity.

In the heat removal structure of the present invention, it is preferable that the fairing define the inlet port further on the front side than the wheel opening, and define the lower ventilation port, which functions as the outlet port, further on the rear side than the inlet port.

Then, a flow of external air suctioned from the front side occurs which heads toward the outlet port on the rear side, and air inside the main landing gear bay is discharged downward through the outlet port located in the outer periphery of the wheel. Here, since a discharge airflow from the outlet port is present in the clearance between the outer peripheral part of the wheel and the fairing which defines the wheel opening, an airflow along the surface of the fairing remains in the state of a laminar flow without being disturbed in the outer periphery of the wheel. That is, the discharge airflow serves to prevent generation of a turbulent flow, which gives resistance to an airflow accompanying flight, and to reduce the air resistance, so that the fuel efficiency of the aircraft can be improved. Moreover, as the air resistance is reduced, noise can also be reduced.

In the heat removal structure of the present invention, it is preferable that the fairing define the inlet port in a front end part of the fairing or in the vicinity thereof.

The nose side of the fairing is typically rising smoothly relative to the center part of the fairing. Thus, compared with the case where the inlet port is defined in the center part of the fairing, the inlet port located in the front end part of the fairing or in the vicinity thereof faces forward. Accordingly, it is possible to take in external air smoothly through the inlet port and cause a sufficient flow of air inside the main landing gear bay.

In the heat removal structure of the present invention, it is preferable that the fairing define the inlet port so as to be depressed from the surface and increase in opening cross-sectional area from an inlet, located on the front side, toward the rear side.

Such an inlet port can suction air with suppressed air resistance.

It is preferable that the heat removal structure of the present invention include a main landing gear door which covers an opening part of a wing bay which is a region of the main landing gear bay formed in a main wing, and opens as the main landing gear is deployed, and that the main landing gear door define a ventilation port which pairs with the lower ventilation port and functions as one of the inlet port and the outlet port.

Then, it is possible to reliably cause a flow of air around the main landing gear. As heat generated from the main landing gear is removed to the outside of the main landing gear bay due to the flow of air, heat propagation to the members located around the main landing gear can be suppressed.

It is preferable that the heat removal structure of the present invention include a shutter which can open/close at least one of the inlet port and the outlet port.

Then, through operation of the shutter, heat can be sufficiently removed from the main landing gear bay by opening the ventilation port when heat removal is required, as well as the air resistance due to the ventilation port can be reduced by closing the ventilation port when heat removal is not required.

It is preferable that the heat removal structure of the present invention include: a driving unit which drives the shutter; a temperature sensor which detects the temperature around the retracted main landing gear; and a controller which sends a control signal for operation of the shutter to the driving unit on the basis of the temperature detected by the temperature sensor.

Then, for example, an operation becomes possible in which, if the detected temperature is equal to or higher than a predetermined threshold value, the ventilation port is opened by the shutter to promote heat removal, and if the detected temperature is lower than the threshold value, the ventilation port is closed by the shutter to reduce the air resistance.

An aircraft of the present invention includes the above-described heat removal structure of a main landing gear bay.

According to the present invention, under constraints on the space of the main landing gear bay into which the main landing gear is retracted and on the weight of the airframe, the members around the main landing gear can be protected from the heat generating part of the main landing gear.

DETAILED DESCRIPTION OF THE PREFERRED EMBODIMENTS

In the following, embodiments of the present invention will be described with reference to the accompanying drawings.

First Embodiment

Figure 1:
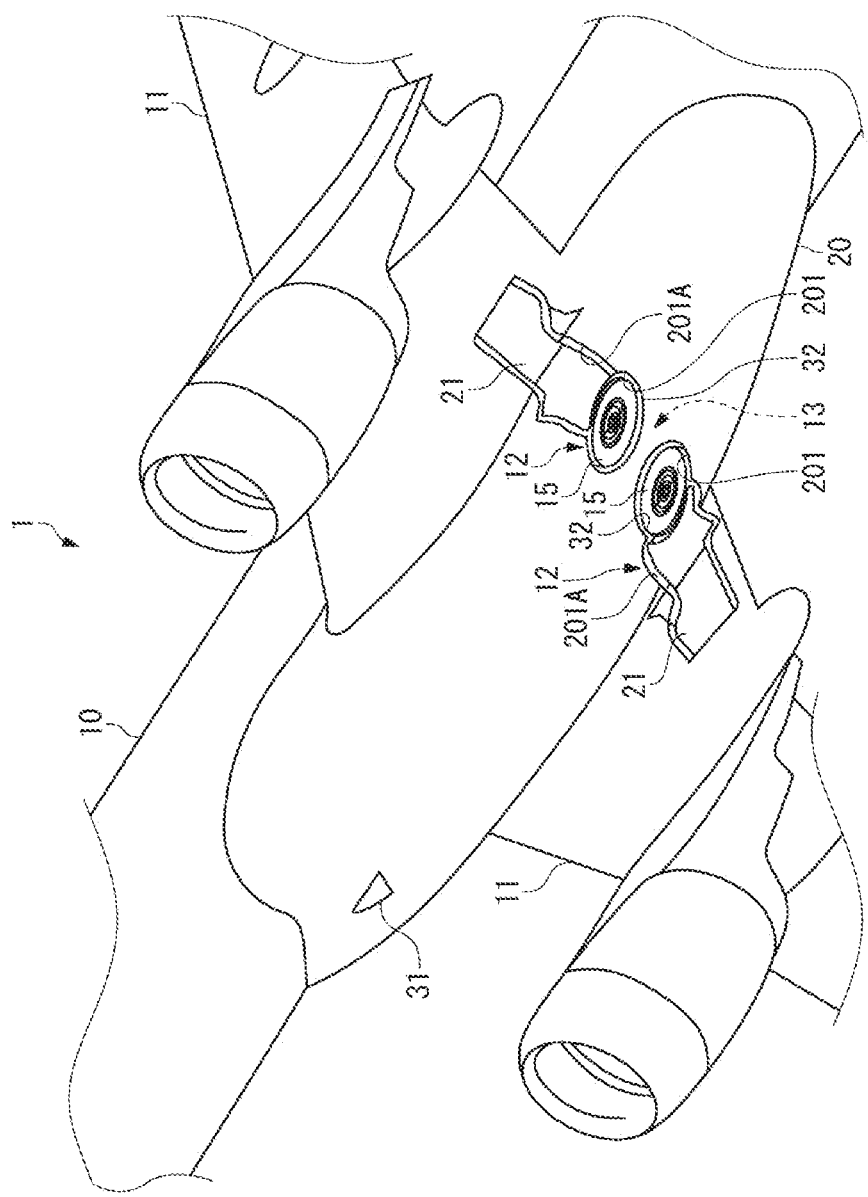
FIG. 1 is a view showing from below a fuselage and main wings of an aircraft according to a first embodiment.

As shown in FIG. 1, an aircraft 1 of this embodiment includes a fuselage 10 and main wings 11 provided on the left side and the right side of the fuselage 10.

In the vicinity of a joint part between the fuselage 10 and the left and right main wings 11, 11, the fuselage 10 is equipped with a pair of left and right main landing gears 12, 12 (undercarriage) supporting an airframe, and a main landing gear bay 13 (FIG. 2) into which the main landing gears 12, 12 are retracted.

Figure 2:
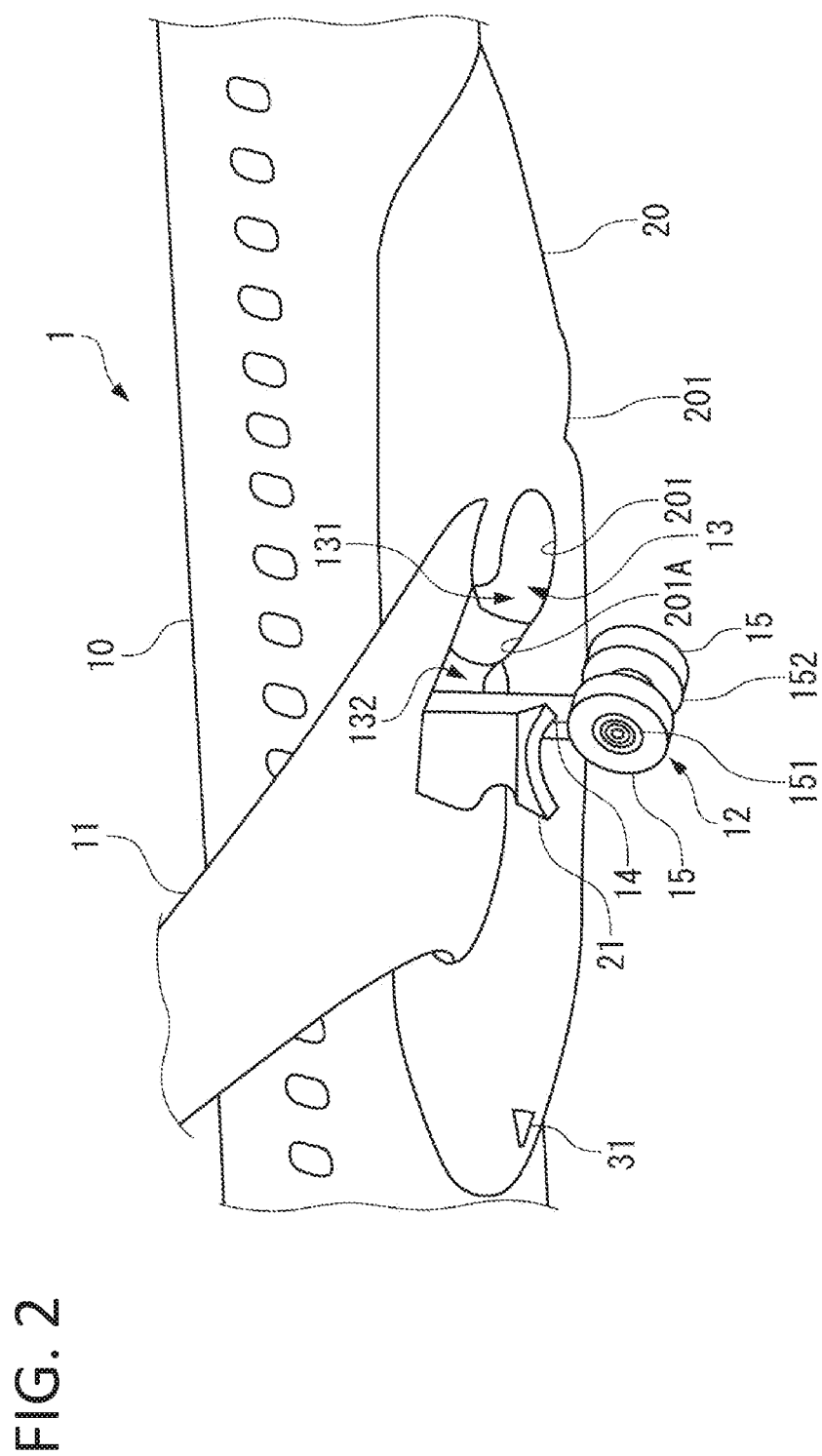
FIG. 2 is a view showing a main landing gear in a deployed state.

As shown in FIG. 2, the main landing gears 12, 12 are deployed downward from the main landing gear bay 13. The right main landing gear 12 is not shown in FIG. 2.

Each main landing gear 12 includes a pillar 14 supporting the airframe, wheels 15, 15 provided on the pillar 14 and traveling on the ground, and braking devices 16, 16 (FIG. 3) respectively braking the wheels 15, 15.

The main landing gear 12 is moved up and down by being turned by a hydraulic actuator (not shown) around a base end part (upper end part) of the pillar 14.

The pillar 14 includes a buffer mechanism which absorbs impact load during landing and vibration load during travel.

The two wheels 15, 15 of the main landing gear 12 are supported coaxially on an axle 15A (FIG. 3) provided on a leading end part (lower end part) of the pillar 14.

Each wheel 15 includes a metal wheel 151 provided through a bearing on the axle 15A, and a rubber tire 152 provided on the outer peripheral part of the wheel 151.

Figure 3:
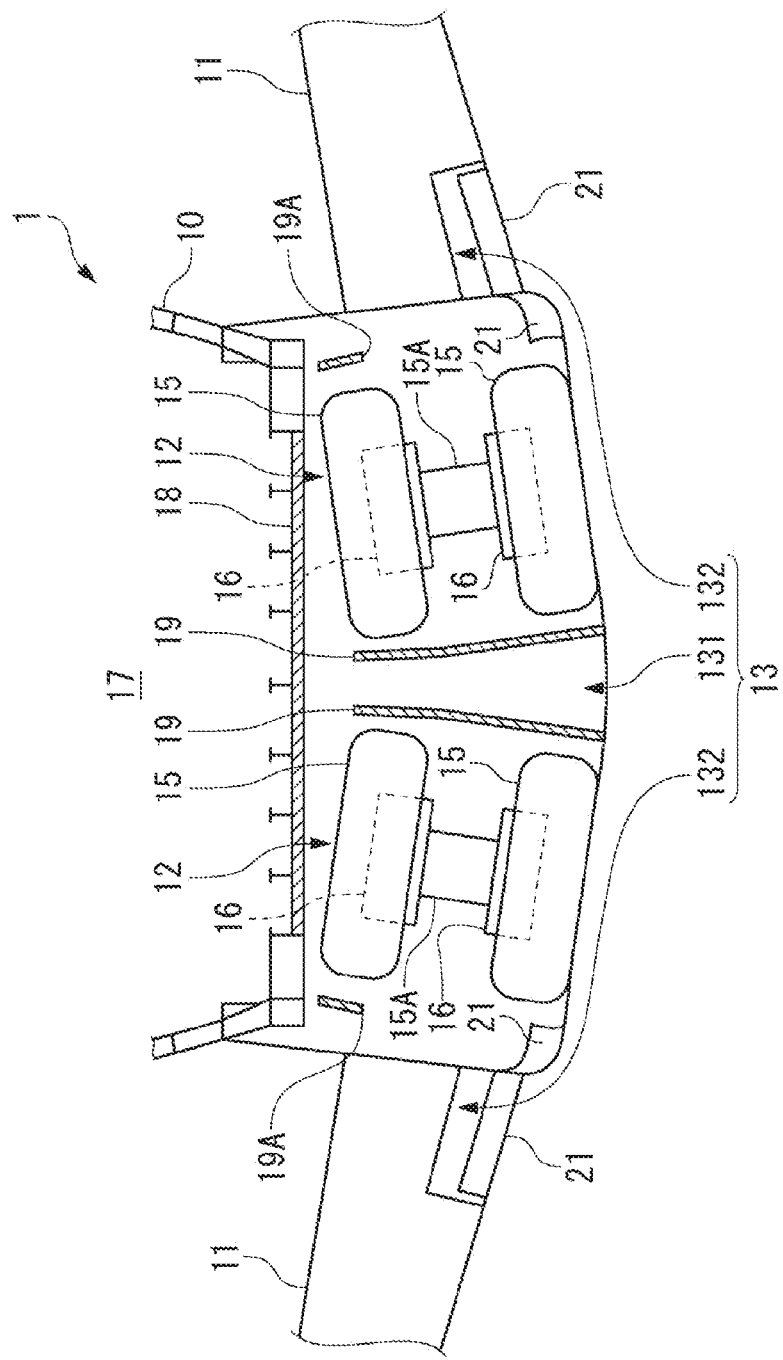
FIG. 3 is a cross-sectional view showing a main landing gear bay with the main landing gear retracted inside.

As shown in FIG. 3, the braking device 16 is disposed around the axle 15A. The braking device 16 includes a stack of brake discs (not shown), which is disposed coaxially with the axle 15A, and a hydraulic cylinder. The stack of brake discs is formed by alternately disposing rotary discs which rotate with the wheel 15 during travel and fixed discs which are fixed on the axle 15A and do not rotate. The wheel 15 is braked as the rotary discs and the fixed discs are brought into close contact with each other by the hydraulic cylinder and rotation of the rotary discs is restricted due to a frictional force occurring between the discs.

As shown in FIG. 2 and FIG. 3, the main landing gears 12, 12 are retracted into the main landing gear bay 13 which extends over a lower part of the fuselage 10 and lower parts of the left and right main wings 11, 11 and is formed so as to be depressed upward.

The main landing gear bay 13 is divided into a fuselage bay 131 formed in the fuselage 10 and wing bays 132, 132 formed respectively in the left and right main wings 11, 11.

As shown in FIG. 3, the fuselage bay 131 is separated by a partition wall 18 from a pressurized section 17 such as a cabin.

The partition wall 18 is a structural member which withstands the differential pressure between the pressurized section 17 and the inside of the fuselage bay 131 and has the strength of the fuselage 10.

Various accessories (not shown) other than the main landing gear 12 are disposed in the fuselage bay 131. In case the tire 152 bursts up in the air, a shielding cylinder 19 surrounding the wheel 15 is suspended from the partition wall 18 to shield these accessories from a jet flow of gas blowing out of the tire 152.

The fuselage bay 131 faces a belly fairing 20 (hereinafter referred to as a fairing) which covers a lower part of the fuselage 10.

As shown in FIG. 2, the fairing 20 extends from a position further on the front side than the fuselage bay 131 to a position further on the rear side than the fuselage bay 131, and aerodynamically straightens airflows around the main landing gear 12 and the joint part between the fuselage 10 and the main wing 11.

The fairing 20 has wheel openings 201, 201 (FIG. 1 and FIG. 2) formed therein through which the wheels 15, 15 of each of the main landing gears 12, 12 enter and exit.

Figure 4:
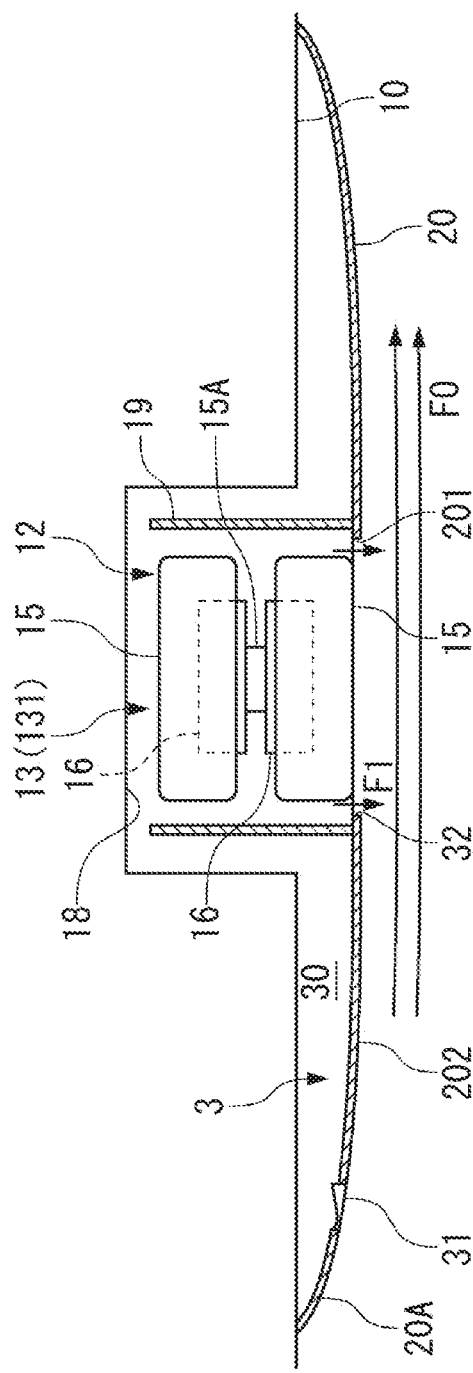
FIG. 4 is a schematic view illustrating the workings of a heat removal structure of the main landing gear bay.

As shown in FIG. 4, the wheel opening 201 is formed along a peripheral edge part at the lower end of the shielding cylinder 19. This wheel opening 201 includes a passage 201A (FIG. 2) through which the pillar 14 is passed.

An opening part of the wing bay 132 (FIG. 2) located on the left side of the fairing 20 is covered by a main landing gear door 21 (FIG. 1) which is provided on the pillar 14 of the left main landing gear 12. The passage 201A of the wheel opening 201 is also covered by the main landing gear door 21.

The same applies to the right side of the fairing 20. An opening part of the right wing bay 132 is covered by the main landing gear door 21 provided on the pillar 14 of the right main landing gear 12, and the passage 201A of the wheel opening 201 is also covered by the main landing gear door 21.

The main landing gear 12 is deployed as shown in FIG. 2 when the aircraft 1 is ready to land. When the main landing gear 12 is deployed, the main landing gear door 21 opens as the pillar 14 turns, and the wheel 15 is moved down through the wheel opening 201 to the outside of the fairing 20.

When the aircraft 1 lands with the pillar 14, a thrust reverser which directs forward a thrust generated by an engine and the braking device 16 which brakes the traveling wheel 15 are used to decelerate the aircraft 1.

Then, the main landing gear 12 is retracted (FIG. 1) after the aircraft 1 travels on a runway and takes off for the next flight. When the main landing gear 12 is drawn inside the main landing gear bay 13, the main landing gear door 21 is closed. When the main landing gear 12 is retracted, the lower wheel 15 of the wheels 15, 15 of the main landing gear 12 is disposed in the wheel opening 201 and exposed to the lower side of the fairing 20. The side surface of the lower wheel 15 (the surface orthogonal to the axle 15A) and the surface of the fairing 20 are disposed so as to be substantially flush with each other.

During takeoff and landing when the main landing gear 12 is used, the wheel 15, the braking device 16, the buffer mechanism of the pillar 14, etc. generate heat. Particularly, the braking device 16 generates a huge amount of frictional heat when braking the wheel 15 which is traveling at a high speed after landing of the aircraft 1.

The temperatures of the wheel 15 and the braking device 16 decrease gradually as heat is released into the atmosphere while the aircraft is parked at an airport. In some cases, however, the parking time is shorter than the time required for the temperatures to decrease sufficiently, and the aircraft takes off for the next flight while the temperatures of the wheel 15 and the braking device 16 are still high. In such cases, it is necessary to prevent propagation of heat, which exceeds the allowable temperatures of the structural members and the accessories around the main landing gear 12 retracted after takeoff, from a hot part of the main landing gear 12 to these structural members and accessories.

Therefore, as shown in FIG. 4, the aircraft 1 of this embodiment includes a heat removal system 3 which removes heat from inside the main landing gear bay 13 to the outside during flight when the main landing gear 12 is retracted.

The heat removal system 3 includes a ventilation cavity 30 which is present between the fairing 20 and the fuselage 10 and communicates with the main landing gear bay 13, one or more inlet ports 31 through which air outside the fairing 20 is suctioned into the ventilation cavity 30, and an outlet port 32 through which air inside the ventilation cavity 30 is discharged to the outside of the fairing 20.

Both the inlet port 31 and the outlet port 32 in this embodiment are formed in the fairing 20 and penetrate the fairing 20.

The outlet port 32 corresponds to an annular clearance formed in the outer periphery of the wheel 15 which is exposed from the wheel opening 201. Even when a seal or a brush is disposed annularly on the inside of the wheel opening 201, there is some clearance in the outer periphery of the wheel 15, and the ventilation cavity 30 leads to external air through this clearance.

The inlet port 31 is located in the vicinity of a front end part 20A of the fairing 20. The front end part 20A is rising gradually and continues to a lower part of the fuselage 10.

While a circular hole, for example, can be formed as the inlet port 31, it is preferable that a so-called NACA scoop (NACA duct), which is depressed from the surface of the fairing 20 and of which the opening cross-sectional area increases continuously, be adopted for the inlet port 31. The NACA scoop has a shape with the width and the depth increasing gradually from the inlet, located at the front end, toward the rear side. The NACA scoop can suction air with suppressed air resistance.

The NACA scoop may be located in a horizontal part 202 of the fairing 20 which extends substantially horizontally during cruise.

During flight, air flowing on the lower side of the fuselage 10 enters the front side of the ventilation cavity 30 through the inlet port 31, while air inside the main landing gear bay 13 communicating with the ventilation cavity 30 is discharged downward through the outlet port 32. As a result, a flow of air occurs inside the ventilation cavity 30 and the main landing gear bay 13. As a negative pressure develops in the vicinity of the outlet port 32 due to an airflow flowing along the surface of the fairing 20, the air inside the main landing gear bay 13 is suctioned downward through the outlet port 32 to the outside.

A flow of air inside the main landing gear bay 13 also occurs around the wheel 15 and the braking device 16 through a cutout 19A of the shielding cylinder 19 (FIG. 3), through which the pillar 14 is passed, or the space between the upper end of the shielding cylinder 19 and the partition wall 18. Accordingly, heat of the hot part of the main landing gear 12 is absorbed and removed to the outside of the main landing gear bay 13 along with the air, so that heat propagation to the structural members and the accessories located around the wheel 15, the braking device 16, etc. can be suppressed.

It is particularly important to avoid a thermal influence on the partition wall 18 which is a structural member. Heat of the wheel 15 and the braking device 16 located on the lower side from the partition wall 18 is emitted to the partition wall 18. Air which has been heated by the wheel 15 and the braking device 16 and risen stagnates on the lower surface side of the partition wall 18.

According to this embodiment, a flow of air inside the ventilation cavity 30 and the main landing gear bay 13 serves to quickly reduce the temperature of the hot part of the main landing gear 12 which is a heat source, and to suppress heat propagation through emission (radiation), conduction, and convection, which makes it possible to keep the temperatures of the structural members and the accessories including the partition wall 18 under their allowable temperatures and to maintain the strength and performance required of these structural members and accessories.

This embodiment is especially suitable to an aircraft which is operated under conditions where it is difficult to sufficiently release heat of the main landing gear 12 during parking of the aircraft, for example, due to a short-distance route with frequent takeoff and landing, or to takeoff and landing at an airport where the ground temperature is high.

The structure for removing heat from inside the main landing gear bay 13 having been described above utilizes the clearance located in the outer periphery of the wheel 15 and can be realized by simply forming the inlet port 31 penetrating the fairing 20. Therefore, it is possible to improve the fuel efficiency by downsizing the airframe and keeping down the weight of the aircraft 1 compared with the case where the distance from the hot part of the main landing gear 12 to the members is increased or a heat insulation material is used.

Air is continuously suctioned/discharged through the inlet port 31 and the outlet port 32 while the aircraft 1 is flying.

As shown in FIG. 4, air inside the main landing gear bay 13 is discharged downward through the outlet port 32 which is located in the outer periphery of the wheel 15 exposed to the outside of the fairing 20. A discharge airflow discharged through the outlet port 32 is indicated by the reference sign F1. The discharge airflow F1 is formed annularly along the entire circumference of the outlet port 32.

Due to the presence of this discharge airflow F1 in the clearance (i.e., the outlet port 32) between the outer peripheral part of the wheel 15 and the fairing 20 which defines the wheel opening 201, an airflow F0 along the surface of the fairing 20 remains in the state of a laminar flow without being disturbed in the outer periphery of the wheel 15. That is, the discharge airflow F1 aerodynamically suppresses generation of a turbulent flow in the outer peripheral part of the wheel 15 exposed to the outside and in the vicinity thereof.

According to this embodiment, the discharge airflow F1 serves to prevent generation of a turbulent flow, which gives resistance to the airflow F0 accompanying flight, and to reduce the air resistance, so that the fuel efficiency of the aircraft 1 can be improved.

Moreover, as the air resistance is reduced, noise can also be reduced.

According to this embodiment, even if the tire 152 bursts up in the air, the pressure of gas blowing out of the tire 152 can be released into external air through the inlet port 31 and the outlet port 32, so that it is possible to avoid generation of an excessively high internal pressure in the main landing gear bay 13 or the ventilation cavity 30.

In the first embodiment, it is not always necessary that the inlet port 31 be located in the front end part 20A of the fairing 20 or in the vicinity thereof. As long as the inlet port 31 is located further on the front side than the wheel opening 201, in other words, further on the front side than the outlet port 32, similar effects can be achieved. Optionally, the inlet ports 31 can be formed respectively at a position in the front end part 20A of the fairing 20 or in the vicinity thereof and at a position further on the rear side than that position, and further on the front side than the wheel opening 201. It is preferable that an NACA scoop be adopted for the inlet port 31 located on the rear side as well.

Second Embodiment

Next, a second embodiment of the present invention will be described with reference to FIG. 5.

In the second embodiment, as in the first embodiment, the clearance located in the outer periphery of the wheel 15 exposed from the wheel opening 201 is used for suctioning/discharging air. However, whether the clearance located in the outer periphery of the wheel 15 functions as the outlet port as in the first embodiment, or functions as the inlet port, is determined by the positional and directional relation with another opening leading to external air. Moreover, the inlet port and the outlet port may be reversed as the differential pressures at the inlet port and the outlet port are reversed according to the state of air pressure and airflow etc.

That is, unlike in the first embodiment in which air is suctioned from the front side and discharged from the rear side, the direction of air suction/discharge is not limited in the second embodiment.

In the following, differences from the first embodiment will be mainly described. The same configurations as in the first embodiment are given the same reference signs.

Figure 5:
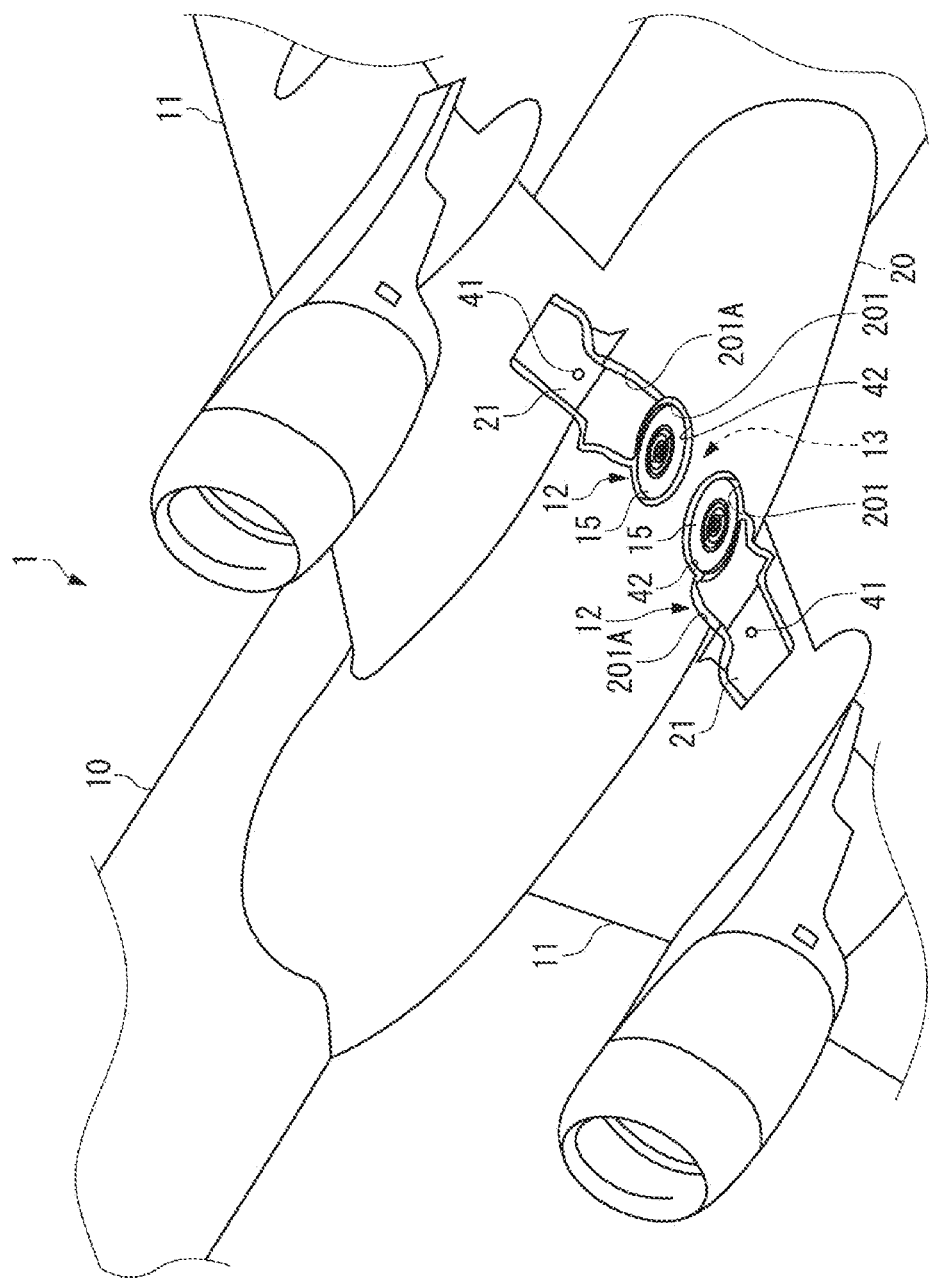
FIG. 5 is a view showing from below a fuselage and main wings of an aircraft according to a second embodiment.

As shown in FIG. 5, in this embodiment, a first ventilation port 41, which penetrates the main landing gear door 21 in the thickness direction, is formed in each of the left and right main landing gear doors 21, 21. The first ventilation port 41 corresponds to a second ventilation port 42 (equivalent to the above-described outlet port 32) located in the outer periphery of the wheel 15. When the first ventilation port 41 functions as the inlet port, the second ventilation port 42 functions as the outlet port, and conversely, when the first ventilation port 41 functions as the outlet port, the second ventilation port 42 functions as the inlet port.

The first ventilation port 41 of the left main landing gear door 21 and the first ventilation port 41 of the right main landing gear door 21 function likewise as the inlet ports or function likewise as the outlet ports at the same timing. Under certain conditions, however, one of the first ventilation ports 41 may function as the inlet port while the other may function as the outlet port. In such a case, at least one of the left and right first ventilation ports 41, 41 and the second ventilation port 42 functions as the inlet port and the others function as the outlet ports.

The differential pressure between the first ventilation port 41 and the second ventilation port 42 causes a flow of air inside the main landing gear bay 13. Since the first ventilation port 41 and the second ventilation port 42 are close to each other, it is possible to reliably cause a flow of air around the main landing gear 12. Moreover, the cutout 19A of the shielding cylinder 19, through which the pillar 14 is passed, contributes to a smooth flow of air between the first ventilation port 41 and the second ventilation port 42.

As air flows, heat of the hot part of the main landing gear 12 is absorbed and is removed along with the air to the outside of the main landing gear bay 13, so that heat propagation to the structural members and the accessories located around the wheel 15, the braking device 16, etc., can be suppressed.

According to this embodiment, the pressure of gas blowing out of the tire 152 which has burst during flight can be released into external air through the first ventilation port 41 and the second ventilation port 42, so that it is possible to avoid generation of an excessively high internal pressure inside the main landing gear bay 13 or the ventilation cavity 30.

In the second embodiment, the first ventilation port 41 can also be disposed on a side of the fairing 20 or at a position further on the rear side than the wheel opening 201 in the fairing 20.

In the second embodiment, if an NACA scoop is adopted for the first ventilation port 41, the first ventilation port 41 can function as the inlet port. That is, the direction of air suction/discharge can be specified such that air is suctioned through the first ventilation port 41 and discharged through the second ventilation port 42. Then, as described above, the air resistance in the vicinity of the outer peripheral part of the wheel 15 can be reduced by the discharge airflow (see F1 of FIG. 4) discharged downward through the second ventilation port 42.

Third Embodiment

Next, a third embodiment of the present invention will be described with reference to FIG. 6.

In the third embodiment, a shutter which can open/close a ventilation port for air suction/discharge will be described.

The ventilation ports for air suction/discharge of the heat removal structure of the main landing gear bay 13 described in the first embodiment and the second embodiment cause some air resistance to an airflow flowing along the surface of the fairing 20 or the main landing gear door 21. Therefore, providing a shutter which can open/close the ventilation port according to the necessity for heat removal is effective in reducing the air resistance.

Figure 6A:
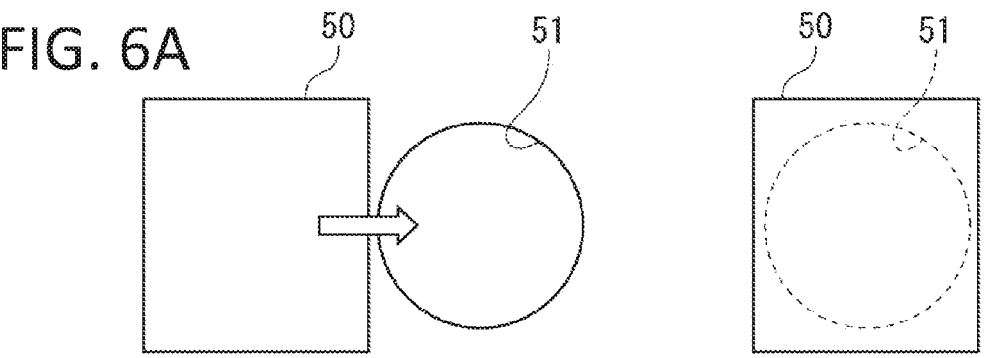
FIGS. 6A, 6B, 6C and 6D are views each showing a shutter of a ventilation port according to a third embodiment.

A shutter 50 shown in FIG. 6A is formed in a plate-like shape, and sliding the shutter 50 along guide rails (not shown) provided in the fairing 20 can open/close a ventilation port 51. As long as the ventilation port 51 can be closed, the shape and the dimensions of the shutter 50 are arbitrary.

The ventilation port 51 represents the ventilation ports described in the first embodiment and the second embodiment. If the shape and the motion of the shutter 50 are properly specified, the shutter 50 can be applied to any of the ventilation ports. In the first embodiment and the second embodiment, the shutter 50 may be used for only some ventilation ports 51 for which the necessity for reduction of air resistance is high.

Here, if even only one of the two ventilation ports functioning respectively as the inlet port and the outlet port is closed by the shutter 50, a flow of air occurring in the main landing gear bay 13 may fall short of the amount required to sufficiently remove the heat of the hot part of the main landing gear 12 to the outside of the main landing gear bay 13. Therefore, in the first embodiment in which the air resistance in the outer periphery of the wheel 15 is reduced by the discharge airflow F1 (FIG. 4) on the assumption of a flow of air inside the main landing gear bay 13, one of the following two options can be appropriately selected: (1) reducing the air resistance in the outer periphery of the wheel 15 while keeping the inlet port 31 and the outlet port 32 open so as to secure a flow of air inside the main landing gear bay 13, and (2) reducing the air resistance by closing at least one of the inlet port 31 and the outlet port 32 using the shutter 50. In the case of (1), the shutter 50 does not need to be provided.

Alternatively, as a compromise measure between (1) and (2), for example, the ventilation port 51 (the inlet port or the outlet port) may be closed by the shutter 50 to an opening degree at which it is about half open (FIG. 6B) so as to reduce the air resistance in the outer periphery of the wheel 15 by causing a flow of air inside the main landing gear bay 13 and at the same time to reduce the air resistance by the amount in which the opening area of the ventilation port 51 is narrowed.

In the following, one example will be described in which the shutter 50 is provided and the ventilation port 51 is opened/closed according to the necessity for heat removal.

For example, in the case where the parking time is long and heat of the wheel 15, the braking device 16, etc. is sufficiently released during parking, since not so much heat as to affect the strength or performance of the members around the retracted main landing gear 12 propagates to these members, the ventilation port 51 can be fully opened by the shutter 50 (the right view in FIG. 6A) to reduce the air resistance due to the ventilation port 51.

Conversely, in the case where the parking time is short and the main landing gear 12 is retracted while the temperatures of the wheel 15, the braking device 16, etc. are still high, the ventilation port 51 can be opened to secure a sufficient flow of air inside the main landing gear bay 13 (the left view in FIG. 6A).

Figure 6B:
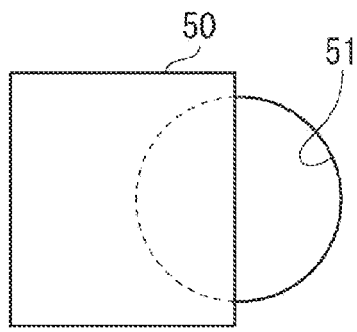

If sufficiently removing the heat generated from the hot part of the main landing gear 12 does not require such a flow of air as there is when the ventilation port 51 is fully opened, the opening degree of the ventilation port 51 can be adjusted through operation of the shutter 50 to a degree just enough to absorb the heat (FIG. 6B).

Otherwise, the opening degree of the ventilation port 51 can be adjusted by the shutter 50 according to the meteorological conditions, such as the air temperature and the weather at the airport, or to the necessity for heat removal based on the weight of the airframe, the operation route, etc.

Figure 6C:
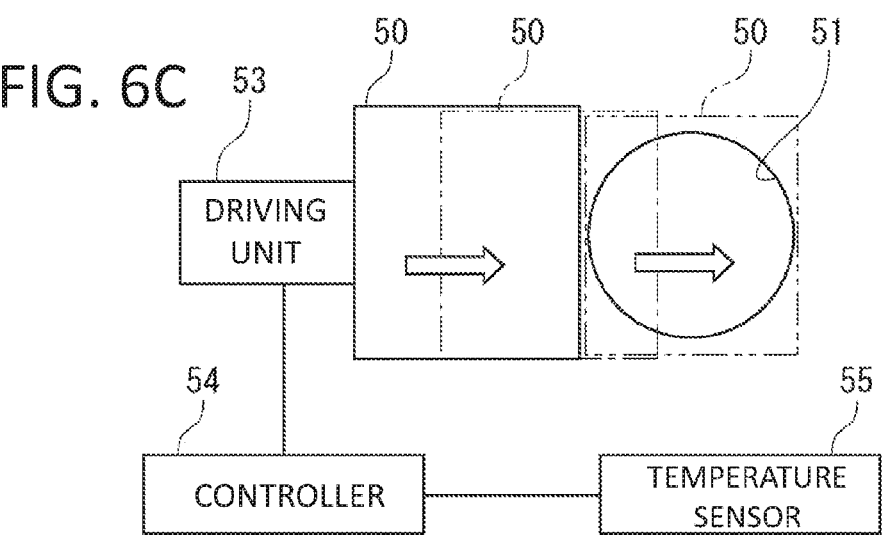

As shown in FIG. 6C, if the heat removal structure includes a driving unit 53, such as an actuator, which drives the shutter 50, and a controller 54 which activates the driving unit 53, it is possible to adjust the opening degree of the ventilation port 51 by sending a control signal from the controller 54 to the driving unit 53 and automatically operating the shutter 50.

If the heat removal structure further includes a temperature sensor 55 which detects the temperature of the main landing gear 12 inside the main landing gear bay 13 or the temperature around the main landing gear 12, it is possible to operate the shutter 50 by the controller 54 on the basis of the temperature detected by the temperature sensor 55.

The temperature to be detected by the temperature sensor 55 can be selected, for example, from the surface temperature of the braking device 16 of the main landing gear 12, the air temperature inside the fuselage bay 131, the surface temperature of the partition wall 18, etc. In particular, to suppress the thermal influence on the partition wall 18, it is preferable that the surface temperature (the temperature of the lower surface) of the partition wall 18 be detected by the temperature sensor 55.

The temperature detected by the temperature sensor 55 corresponds to the necessity for heat removal of the main landing gear bay 13: the higher the detected temperature, the higher the necessity for heat removal, and the lower the detected temperature, the lower the necessity for heat removal. On the basis of the detected temperature, the shutter 50 can be operated such that heat removal is promoted by opening the ventilation port 51 by the shutter 50 (the shutter 50 indicated by the solid line in FIG. 6C) for a while after takeoff and retraction of the main landing gear 12, and that, as the necessity for heat removal decreases accordingly, the ventilation port 51 is gradually closed as indicated by the one-dot chain line and the two-dot chain line in FIG. 6C.

The shutter 50 can also be used for properly setting the opening degree of the ventilation port 51 so that the air resistance in the outer periphery of the wheel 15 can be sufficiently reduced by the discharge airflow F1.

Figure 6D:
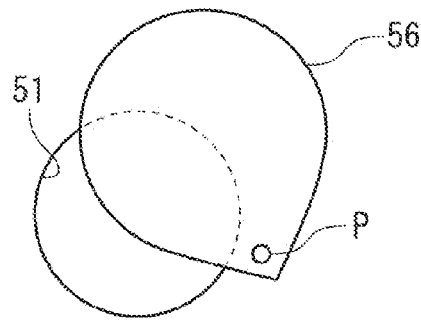

Instead of the sliding shutter 50, a rotating shutter 56 shown in FIG. 6D can also be used. The plate-like shutter 56 is rotatable around a position P eccentric to the center of the plane.

Both the shutters 50, 56 have a low air resistance since they are disposed along the surface of the fairing 20 or the main landing gear door 21 in which they are installed.

Other than these shutters, shutters in arbitrary forms, for example, a shutter with a plurality of blades, may be used.

A bimetal, which is formed of metals having different linear expansion coefficients laid one on top of the other, can also be used as the driving source for activating the shutters 50, 56. In that case, the structure can be configured such that the shutters 50, 56 are activated and open the ventilation port 51 as the bimetal having risen in temperature due to air inside the ventilation cavity 30 and the main landing gear bay 13 deforms.

Otherwise, the configurations presented in the above-described embodiments may be selectively adopted or modified into other configurations within the scope of the present invention.

What is claimed is:

1. A heat removal structure of an aircraft main landing gear bay comprising:
    a fairing which covers a lower part of a fuselage having a main landing gear bay formed therein into which a main landing gear having a wheel is retracted, and defines a ventilation cavity communicating with the main landing gear bay between the fairing and the main landing gear bay; and
    a heat removal system which removes heat generated from the main landing gear retracted inside the main landing gear bay to the outside of the main landing gear bay by suctioning/discharging air through an inlet port and an outlet port leading to external air, wherein
    the fairing defines a wheel opening through which the wheel of the main landing gear enters and exits, and defines a lower ventilation port which functions as one of the inlet port and the outlet port, the lower ventilation port defined by a space between the fairing and an outer peripheral part of the wheel which is exposed from the wheel opening to the lower side of the main landing gear bay when the main landing gear is retracted; and
    the outlet port is located in a position different from a position where the inlet port is located.

2. The heat removal structure of an aircraft main landing gear bay according to claim 1, wherein the inlet port is located closer to a nose of the aircraft than the wheel opening, and the lower ventilation port, which functions as the outlet port, is located closer to an empennage side of the aircraft than the inlet port.

3. The heat removal structure of an aircraft main landing gear bay according to claim 2, wherein the fairing defines the inlet port in a front end part of the fairing or in the vicinity thereof.

4. The heat removal structure of an aircraft main landing gear bay according to claim 2, wherein the inlet port is depressed from a surface of the fairing and has an opening cross-sectional area that increases from an inlet of the inlet port to an outlet of the inlet port.

5. The heat removal structure of an aircraft main landing gear bay according to claim 1, further comprising a main landing gear door which covers an opening part of a wing bay which is a region of the main landing gear bay formed in a main wing, and opens as the main landing gear is deployed, wherein the main landing gear door defines a ventilation port which pairs with the lower ventilation port and functions as one of the inlet port and the outlet port.

6. The heat removal structure of an aircraft main landing gear bay according to claim 5, wherein the ventilation port is depressed from a surface of the main landing gear door and has an opening cross-sectional area that increases from an inlet of the ventilation port to an outlet of the ventilation port.

7. The heat removal structure of an aircraft main landing gear bay according to claim 1, further comprising a shutter which can open/close at least one of the inlet port and the outlet port.

8. The heat removal structure of an aircraft main landing gear bay according to claim 7, further comprising:
    a driving unit which drives the shutter;
    a temperature sensor which detects the temperature around the retracted main landing gear; and
    a controller which sends a control signal for operation of the shutter to the driving unit on the basis of the temperature detected by the temperature sensor.

9. An aircraft comprising the heat removal structure of a main landing gear bay according to claim 1.

* * * * *